(12) United States Patent
Sun et al.

(10) Patent No.: US 10,586,559 B1
(45) Date of Patent: Mar. 10, 2020

(54) SIDE SHIELD FORMATION (71) Applicant: Seagate Technology LLC, Cupertino, CA (US)

(72) Inventors: Jia Sun, Eden Prairie, MN (US); Dong Lin, Eden Prairie, MN (US); Shen Zhe, Lakeville, MN (US); Jianhua Xue, Maple Grove, MN (US); Wei Tian, Eden Prairie, MN (US); Joe Mundenar, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/216,419

(22) Filed: Dec. 11, 2018

(51) Int. Cl.
*G11B 5/31* (2006.01)
*G11B 5/11* (2006.01)
*G11B 5/115* (2006.01)

(52) U.S. Cl.
CPC ............. *G11B 5/112* (2013.01); *G11B 5/115* (2013.01); *G11B 5/3116* (2013.01); *G11B 5/3163* (2013.01)

(58) Field of Classification Search
None
See application file for complete search history.

(56) References Cited

U.S. PATENT DOCUMENTS

| | | | | |
|---|---|---|---|---|
| 8,347,489 B2* | 1/2013 | Hong | .................... | G11B 5/1278 216/22 |
| 8,365,393 B1* | 2/2013 | Benakli | ................. | G11B 5/3116 204/192.11 |
| 8,404,128 B1* | 3/2013 | Zhang | .................. | G11B 5/1278 216/22 |
| 8,720,044 B1 | 5/2014 | Tran et al. | | |
| 8,842,390 B2* | 9/2014 | Shen | ..................... | G11B 5/3116 360/125.3 |
| 9,349,393 B2 | 5/2016 | Zheng et al. | | |
| 9,711,168 B1 | 7/2017 | Yang et al. | | |
| 9,741,366 B1 | 8/2017 | Zhang et al. | | |
| 9,972,345 B1 | 5/2018 | Tian et al. | | |
| 10,102,871 B1 | 10/2018 | Basu et al. | | |
| 2010/0321835 A1* | 12/2010 | Zhang | .................. | G11B 5/3116 360/319 |
| 2015/0187373 A1* | 7/2015 | O'Donnell | ............. | G11B 5/112 216/22 |
| 2015/0380018 A1 | 12/2015 | Zheng et al. | | |

* cited by examiner

*Primary Examiner* — William J Klimowicz
(74) *Attorney, Agent, or Firm* — Westman, Champlin & Koehler, P.A.

(57) ABSTRACT

A method includes forming a write pole layer having a front surface, a leading surface, a trailing surface and side surfaces connecting the leading surface to the trailing surface. The method also includes forming side shield layers proximate to the side surfaces of the write pole layer. A patterned sacrificial layer is deposited over the side shield layers, and a trailing surface bevel is formed on the write pole layer.

9 Claims, 10 Drawing Sheets

SIDE SHIELD FORMATION

SUMMARY

In one embodiment, a method is provided. The method includes forming a write pole layer having a front surface, a leading surface, a trailing surface and side surfaces connecting the leading surface to the trailing surface. The method also includes forming side shield layers proximate to the side surfaces of the write pole layer. A patterned sacrificial layer is deposited over the side shield layers, and a trailing surface bevel is formed on the write pole layer.

In another embodiment, a method is provided. The method includes forming a write pole layer having a front surface, a leading surface, a trailing surface and side surfaces connecting the leading surface to the trailing surface. The front surface of the write pole layer forms a portion of a bearing surface of a recording head that includes the write pole layer. The method also includes forming side shield layers proximate to the side surfaces of the write pole layer, and planarizing the side shield layers such that trailing surfaces of the side shield layers are substantially flush with the trailing surface of the write pole layer. A sacrificial layer is deposited on the planarized side shield layers and not on the write pole layer. A trailing surface bevel is formed on the write pole layer.

In yet another embodiment, an intermediate recording head structure is provided. The structure includes a write pole layer having a front surface, a leading surface, a trailing surface and side surfaces connecting the leading surface to the trailing surface. The structure further includes side shield layers proximate to the side surfaces of the write pole layer, and a sacrificial layer on the side shield layers and not on the write pole layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to side shields for magnetic recording heads. In some embodiments, techniques employed to form the side shields produce side shield structures that help minimize side track erasure (STE) by magnetic recording heads that include the side shields. However, prior to providing additional details regarding the different embodiments, a description of an illustrative operating environment is provided below.

Figure 1A:
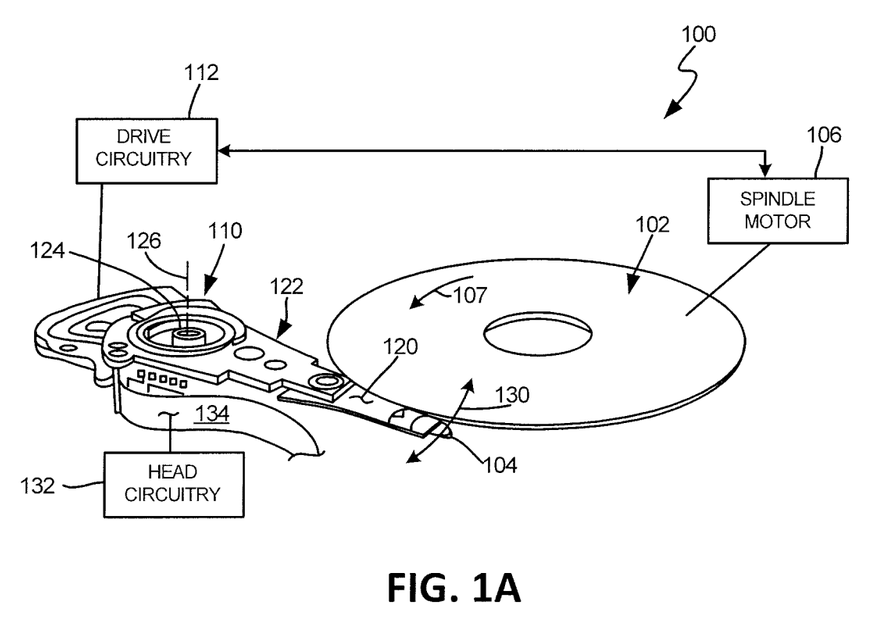
FIG. 1A illustrates an embodiment of a data storage device in which embodiments of the present application can be used.

FIG. 1A shows an illustrative operating environment in which certain recording head embodiments as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
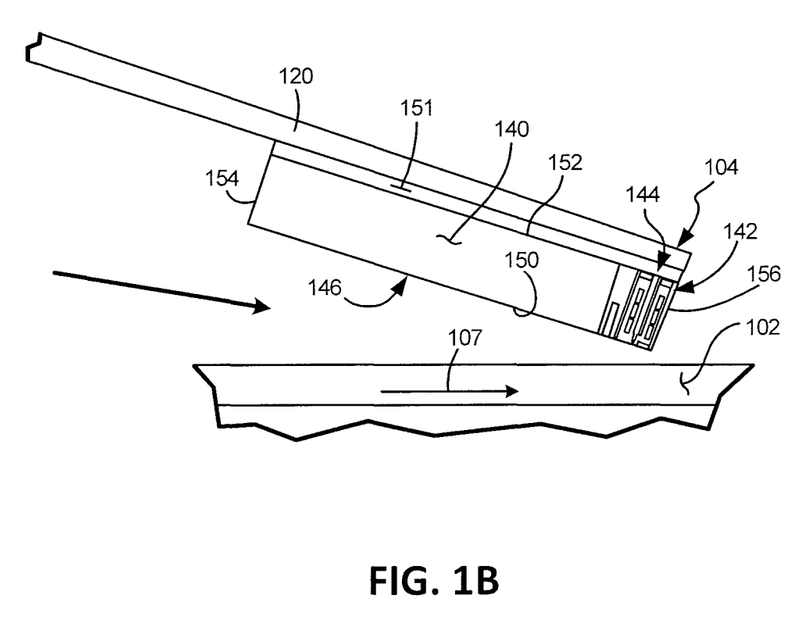
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 2A and 2B.

Figure 2A:
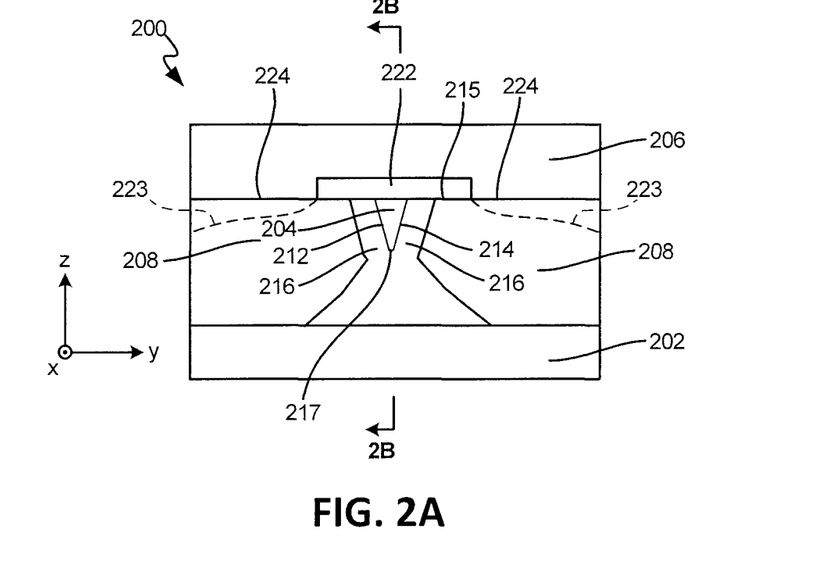
FIG. 2A depicts a bearing surface view of a perpendicular magnetic recording (PMR) transducer in accordance with one embodiment.
Figure 2B:
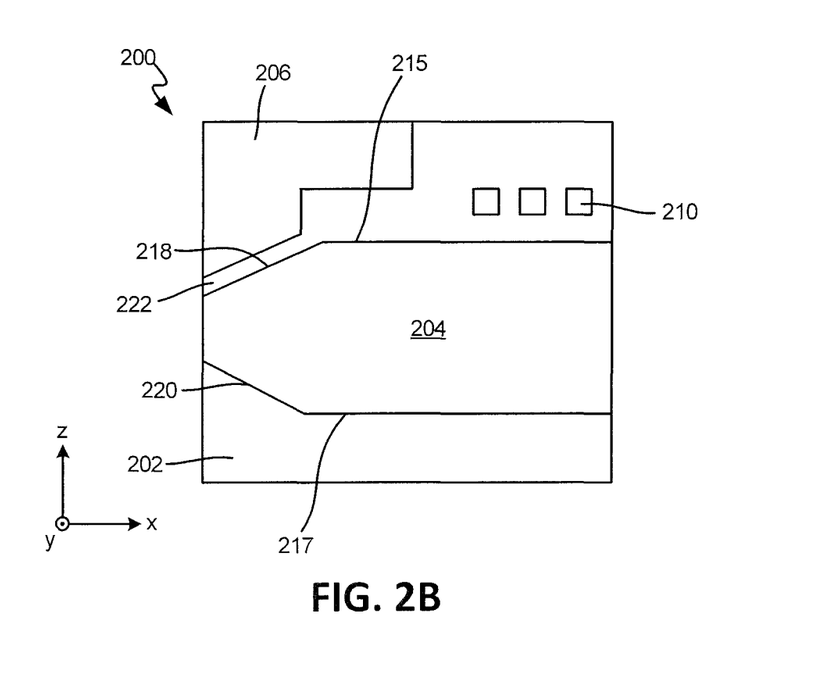
FIG. 2B depicts a side view of the PMR transducer of FIG. 2A.

FIGS. 2A and 2B depict ABS and side views, respectively, of a perpendicular magnetic recording (PMR) transducer 200. The PMR transducer 200 may be a part of a merged head including the write transducer 200 and a read transducer (not shown). Alternatively, the magnetic recording head may be a write head only including the write transducer 200. The PMR transducer elements shown in FIGS. 2A and 2B are illustratively included in a recording head such as recording head 104 of FIGS. 1A and 1B.

The write transducer 200 includes an under-layer/substrate 202, a main pole 204, a trailing edge shield 206 and side shields 208. The under-layer 202 may include a return pole and other multiple structures which are under the pole 204. In some embodiments, the multiple structures may include read sensor layers, read sensor shields, etc. In other embodiments, no read sensor structures may be included. The write transducer 200 may also include other components including but not limited to coils (denoted by reference numeral 210 in FIG. 2B) for energizing the main pole 204.

The main pole 204 resides over under-layer 202 and includes sidewalls 212 and 214. Sidewalls 212 and 214 are separated from the side shields 208 by non-magnetic side shield gaps (SSGs) 216. A top (trailing) surface 215 of the main pole 204 has a beveled portion 218. A bottom (leading) surface 217 of the main pole 204 may also include a leading surface bevel 220. It should be noted that, although main pole 204 of FIG. 2A has a trapezoidal shape, in some embodiments, the main pole 204 may have a triangular shape with sidewalls 212 and 214 meeting at the bottom of the main pole 204. Accordingly, in such embodiments, portions of the leading surface 217 may only include a leading edge where sidewalls 212 and 214 meet. A trailing edge shield gap (TSG) 222 is formed between the trailing edge shield 206 and the main pole 204.

Figure 2C:
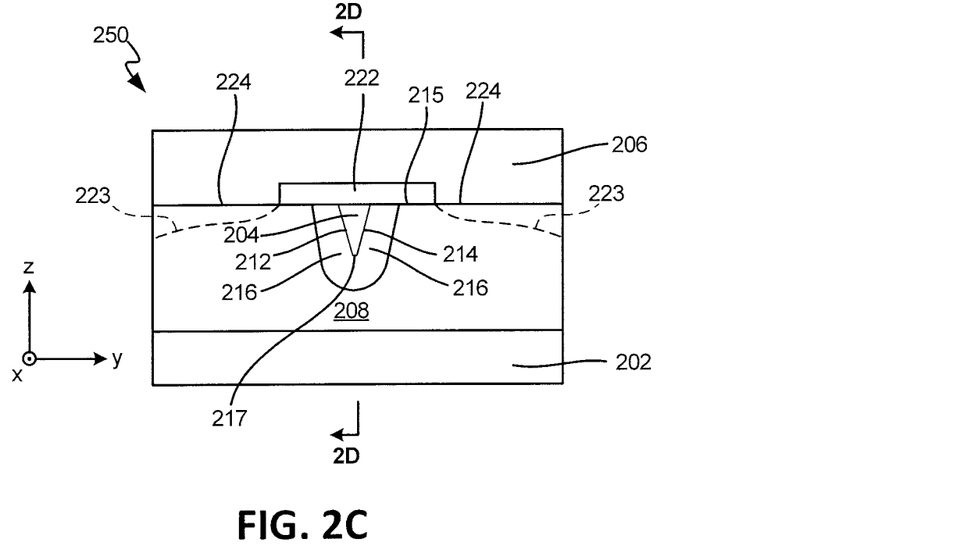
FIG. 2C depicts a bearing surface view of a PMR transducer in accordance with another embodiment.
Figure 2D:
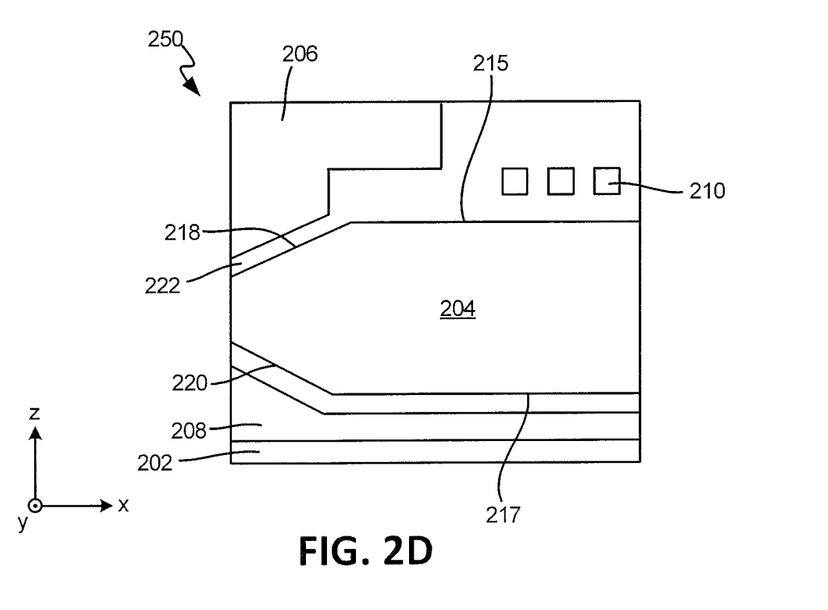
FIG. 2D depicts a side view of the PMR transducer of FIG. 2C.

FIGS. 2C and 2D depict air bearing surface and side views, respectively, of a perpendicular magnetic recording (PMR) transducer or head 250 that has a wrap-around shield configuration in accordance with another embodiment. As can be seen in FIG. 2C, side shields 208 are connected below a leading edge or bottom edge of the main pole 204. In other respects, heads 200 and 250 are substantially similar.

Current writer fabrication processes include top or trailing bevel and TSG formation steps that over-mill into the side shields and remove a significant amount of the side shields, which results in a cross-track slope (shown by dashed lines 223 in FIGS. 2A and 2C) on trailing surfaces of the side shields. This reduces side shield volume in the vicinity of the write pole, thereby contributing to possible erasure hot spots.

Embodiments of the disclosure, which are described in detail below, provide a top or trailing bevel formation process that reduces the over-mill into the side shields 208, which helps create a substantially flat side shield trailing surface (denoted by reference numeral 224 in FIGS. 2A and 2C). As will be described in detail below, this process includes the formation of a patterned sacrificial layer on top of the side shields prior to the top bevel formation to eliminate the over-mill into the side shields during the top bevel formation process.

Figure 3:
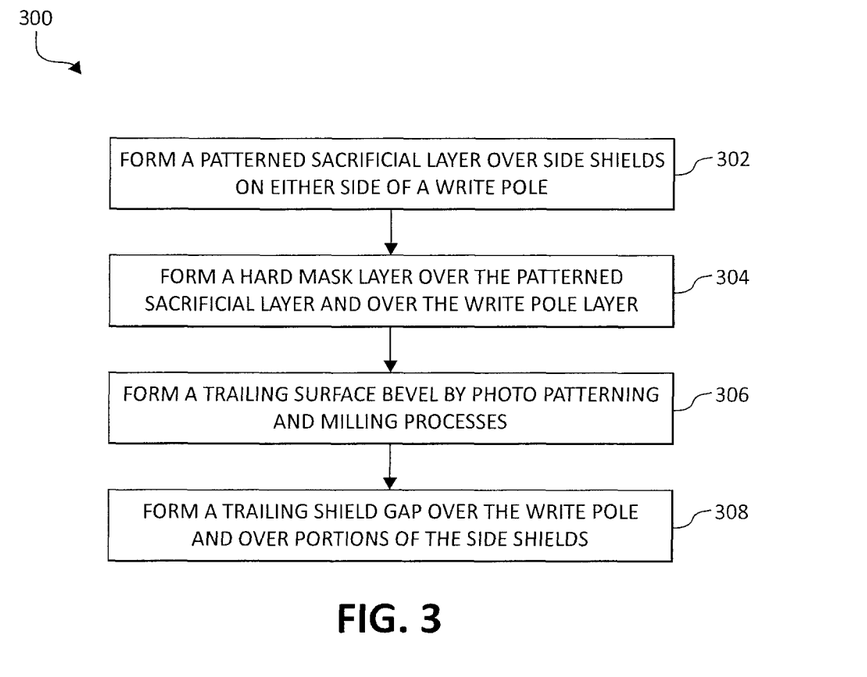
FIG. 3 is a flow diagram of a method embodiment.

FIGS. 3 and 4A-4K illustrate processes carried out during manufacturing of a write head such as 200 of FIGS. 2A and 2B. FIG. 3 is a flow diagram 300 of an example process sequence to form a magnetic recording head such as 200 (of FIGS. 2A and 2B) having side shields with substantially flat upper or trailing surfaces. It should be noted that, although the process described below in connection with FIGS. 3 and 4A-4K is for side shield formation in a split side shield write head, similar process steps may be taken with a wrap-around shield design of FIGS. 2C and 2D.

Figure 4A:
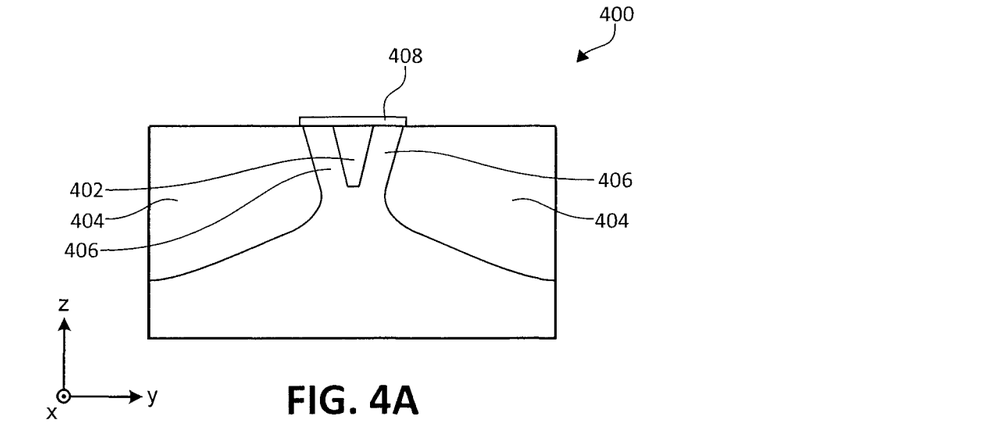
FIGS. 4A-4K illustrate process steps for fabricating a write head of the type shown in FIG. 2A.
Figure 4B:
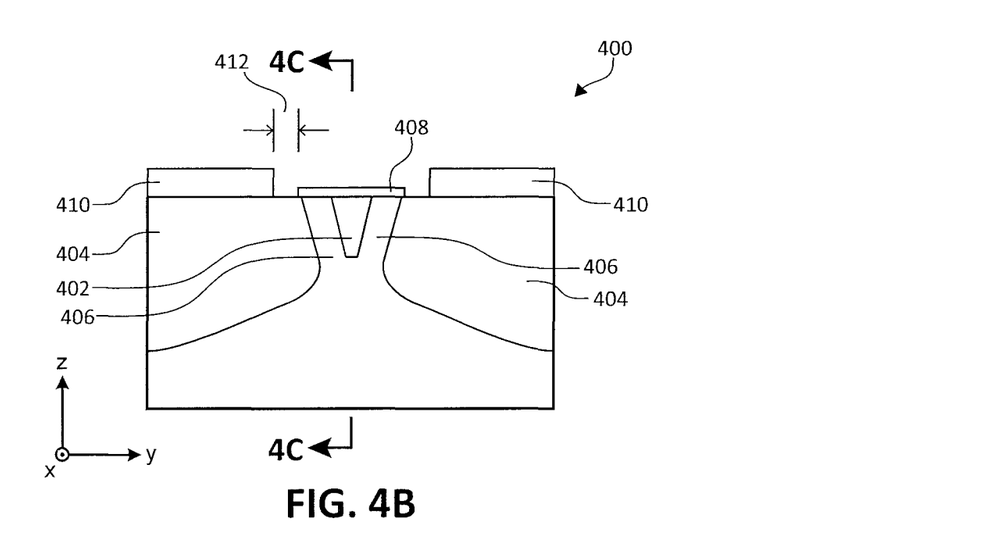

The process sequence intercepts the recording head build after side shields adjacent to a write pole have been plated and planarized (e.g., by chemical-mechanical planarization or polishing (CMP)) as shown in FIG. 4A. FIG. 4A illustrates a first partial write head structure 400 that includes a variety of layers. The layers include a write pole layer 402, magnetic side shield layers 404, non-magnetic side shield gap layers 406 and a hard mask layer portion 408, which may be left over after CMP. The hard mask layer portion 408 may comprise alumina ($Al_2O_3$).

Figure 4C:
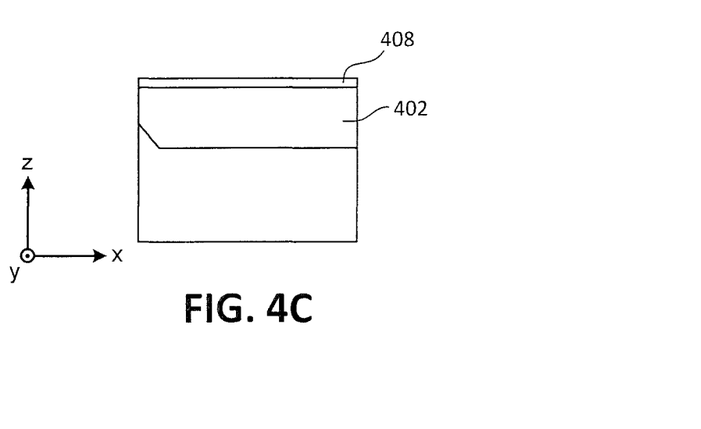

Starting with first partial write head structure 400, block 302 of flowchart 300 of FIG. 3 is performed. Block 302 involves forming a patterned sacrificial layer 410 (shown in FIG. 4B) on top of the side shield layers 404. In one embodiment, the sacrificial layer 410 is formed of amorphous carbon (aC). In other embodiments, any suitable material other than aC may be utilized to form the sacrificial layer 410. In some embodiments, a thickness of the sacrificial layer 410 may be in a range of a few nanometers to a few tens of nanometers. In one embodiment, a definition of a dimension of the sacrificial layer 410 includes aC deposition, photo patterning, and an inductively coupled plasma (ICP) etch process. The dimension and a gap 412 between layer 408 and layer 410 may vary with the writer pole 402 and gap layer 406 dimensions and may be in a range of a few tens and a few hundreds of nanometers. The performance of block 302 provides a second partial write head structure 414 shown in FIG. 4B. FIG. 4C is a cross-sectional view of partial write head structure 414 of FIG. 4B through a plane orthogonal to the bearing surface and layers of structure 414.

On second partial write head structure 414, in accordance with block 304 (of FIG. 3), a hard mask layer 416 is formed over the patterned sacrificial layer 410 and over the write pole 402. In one embodiment, the hard mask layer 416 may include alumina ($Al_2O_3$). The formation of the hard mask layer 416 may involve a planarization process, such as a CMP operation, and results in a third partial write head structure 418 of FIG. 4D.

Figure 4D:
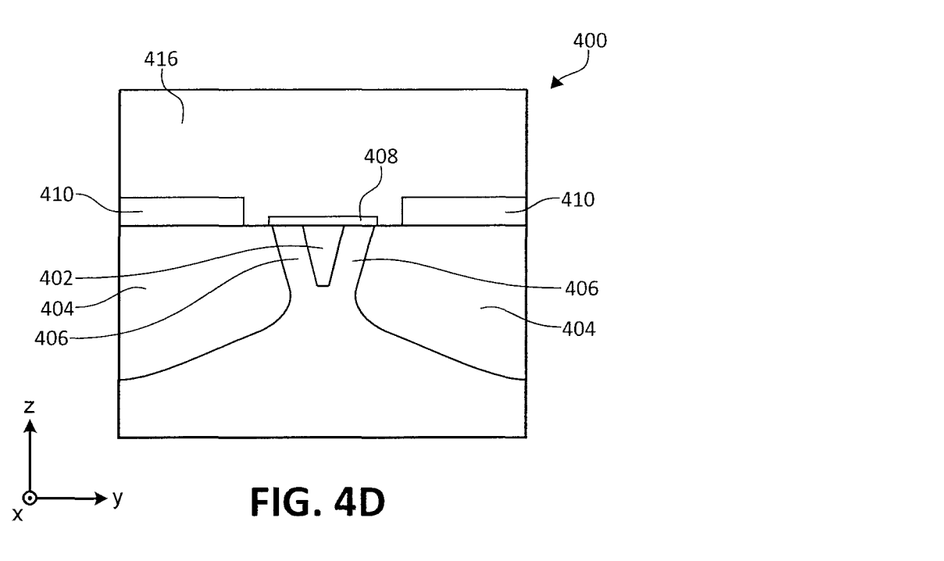

A process of block 306 of FIG. 3 is then performed on third partial write head structure 418 of FIG. 4D. This involves forming a trailing surface bevel by photo patterning and milling processes. Photo patterning includes forming a photoresist layer 420 that covers a portion of the hard mask layer 416 as shown in FIG. 4E.

Figure 4E:
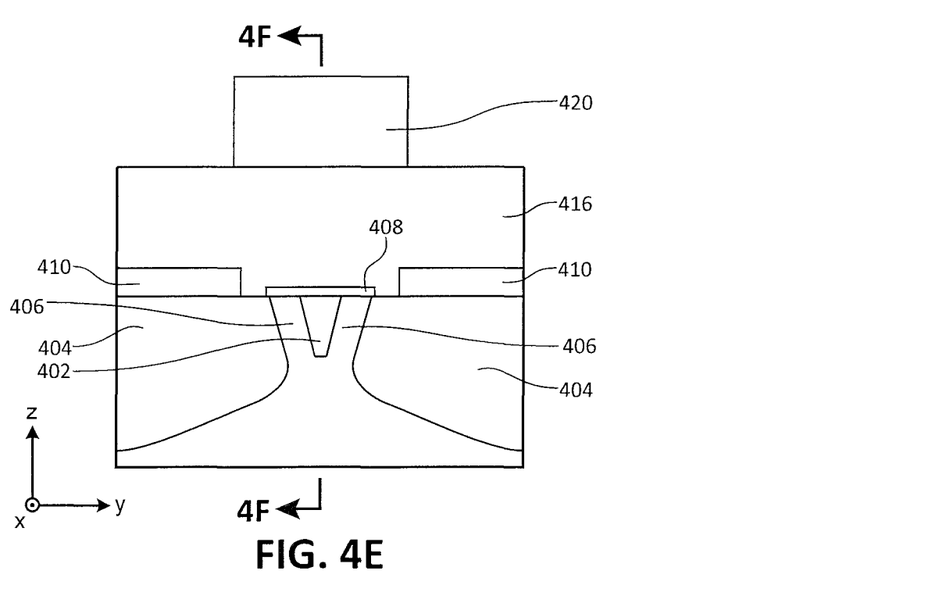
Figure 4F:
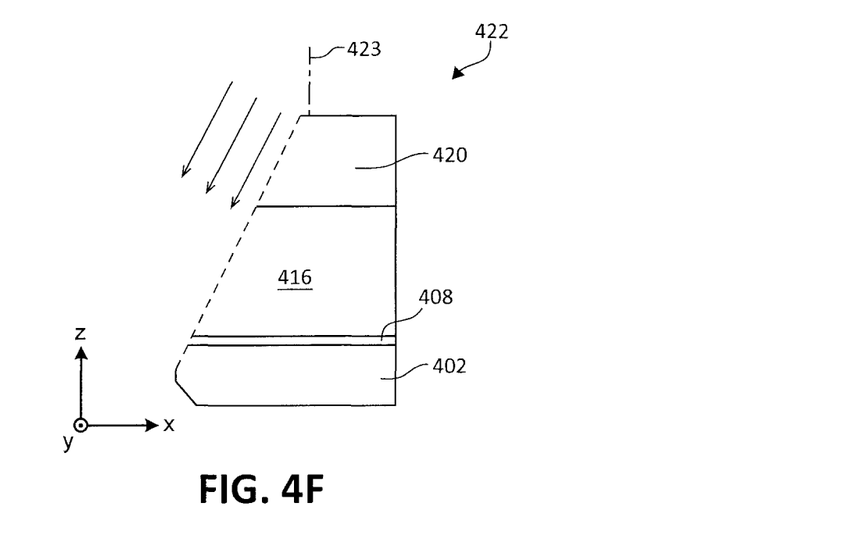
Figure 4G:
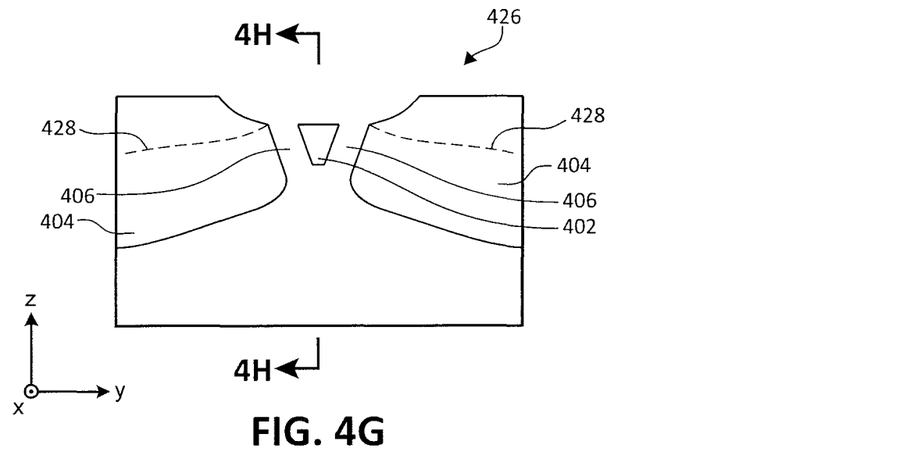

FIG. 4F is a cross-sectional view of partial write head structure 418 with photoresist layer 420 of FIG. 4E through a plane orthogonal to the bearing surface and layers of structure 418 and photoresist layer 420. As can be seen in FIG. 4F, the photoresist layer 420 is recessed behind the bearing surface. The milling process is carried out at an angle as shown by arrows 422 in FIG. 4F. The angle is relative to a normal 423 to an upper surface of the photoresist mask 420. The milling process removes portions of the photoresist layer 420, the hard mask layer 416, hard mask layer portion 408 and pole layer 402. Completion of the milling process provides a fourth partial write head structure 426 shown in FIG. 4G, which shows a final shape of the side shields 404 after trailing bevel 424 (shown in FIG. 4H) is formed. Dashed lines 428 in FIG. 4G represent the trailing surface of the side shields 402 produced by a current process that includes no sacrificial layer 410. Sacrificial layer 410 has a higher mill resistance than other layers such as pole layer 402, side shield layers 404, hard mask layers 408 and 416, etc., and therefore sloping of side shield layers 404 (shown by dashed lines 428) due to excessive side shield 404 material removal is avoided by the inclusion of sacrificial layer 410.

Figure 4H:
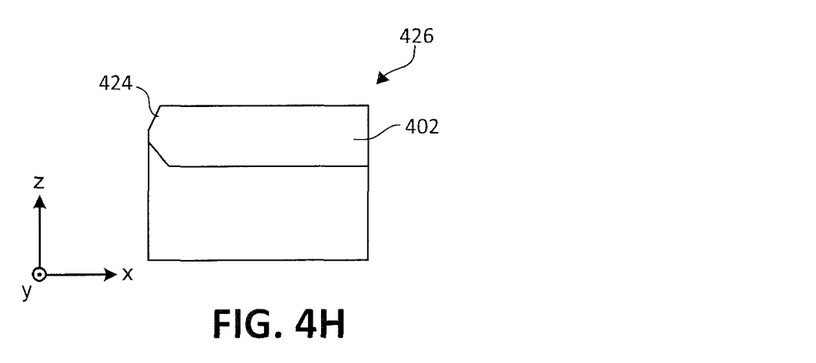

As can be seen in FIG. 4G, the training surfaces of the side shields 404 are slightly elevated above the trailing surface of the write pole 402 (e.g., the trailing surface of the side shields 404 is not flush with the trailing surface of the write pole 402). As will be described further below, in some embodiments, a front shield gap formation process results in flattening of the trailing surfaces of the side shields 404, thereby resulting in a write head structure in which the trailing surface of the write pole 402 is substantially flush with the trailing surface of the side shields 404. FIG. 4H is a cross-sectional view of fourth partial write head structure 426 of FIG. 4G through a plane orthogonal to the bearing surface and layers of structure 426. As indicated above, FIG. 4H shows trailing surface bevel 424 formed by the above-described milling process.

Figure 4I:
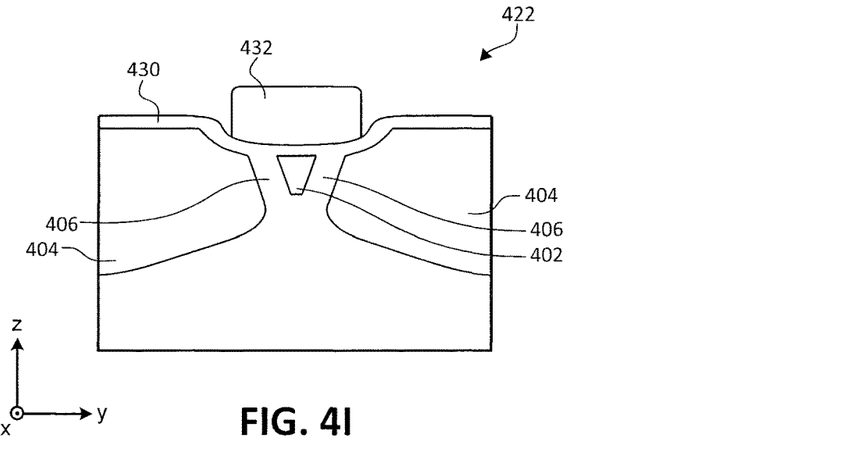
Figure 4J:
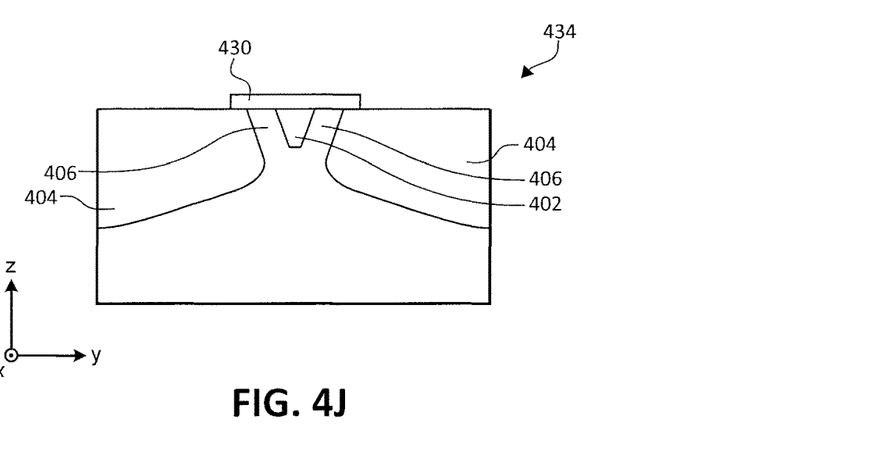
Figure 4K:
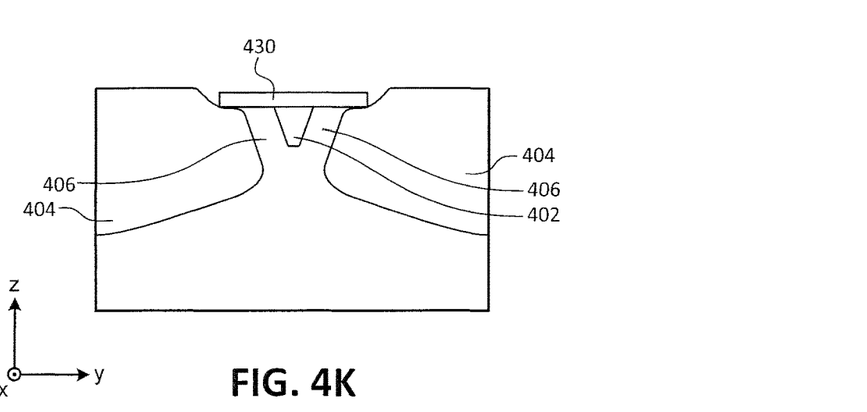

A trailing shield gap formation process of block 308 of FIG. 3 is then carried out on fourth partial write head structure 426 of FIG. 4G. As can be seen in FIG. 4I, the trailing shield gap formation process first involves depositing a non-magnetic gap layer 430. The non-magnetic gap layer 430 is then shaped using a photoresist mask 432, and ion beam etching (IBE), for example, is performed to achieve a nominal/predetermined trailing shield gap width. When IBE is carried out to remove portions of the non-magnetic gap layer 430 that is not covered by the photoresist mask 432, a small portion of the side shield 404 material is also removed, thereby producing a fifth partial write head structure 434 shown in FIG. 4J in which the trailing surface of the write pole 402 is substantially flush with the trailing surface of the write shields 404. As noted above, the milling rate of the sacrificial layer 410 material is less than milling rates of other layers such as pole layer 402, side shield layers 404, hard mask layers 408 and 416, etc. Accordingly, by increasing a thickness of the sacrificial layer 410 and not altering the trailing shield gap formation process of block 308 of FIG. 3, an alternative fifth partial write head structure 436 shown in FIG. 4K, in which the trailing surface of the side shields is above the trailing surface of the write pole, may be formed. Thus, the method of FIG. 3 is an example of a process that gives consideration for control of tolerances of key elements of the recording head design. In the interest of brevity, a description of subsequent recording head formation steps (e.g., trailing shield formation) is not included.

Figure 5:
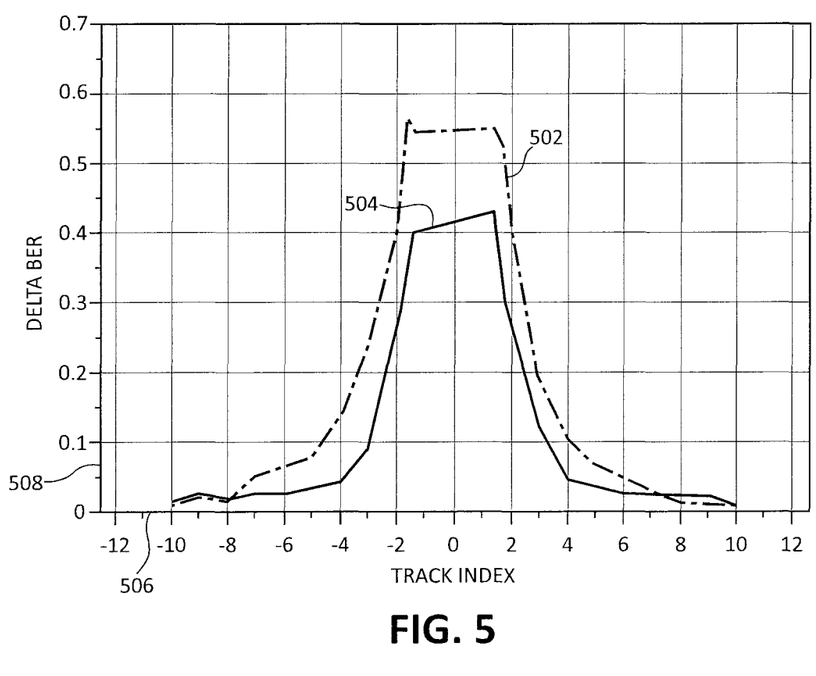
FIG. 5 is a graph of experimental results.

FIG. 5 is a graph 500 that includes a plot 502 of electrical testing results of current recording heads, which are formed by processes that do not employ a sacrificial layer such as 410 (of FIG. 4B) to help ensure that trailing surfaces of side shields are substantially flat, and plot 504 of electrical testing results of recording heads formed by the method of FIG. 3, which utilizes a sacrificial layer to help ensure that trailing surfaces of the side shields are substantially flat. In FIG. 5, horizontal axis 506 represents track number or track index and vertical axis 508 represents delta BER (bit error rate). Track 0 is the track on which the write operations with the write heads take place, and the track numbers on either side of track 0 denote tracks on either side of track 0. A comparison of plots 502 and 504 shows a substantial improvement in erasure performance in write heads formed by the method of FIG. 3.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   forming a write pole layer having a front surface, a leading surface, a trailing surface and side surfaces connecting the leading surface to the trailing surface;
   forming side shield layers proximate to the side surfaces of the write pole layer;
   depositing a patterned sacrificial layer over the side shield layers;
   forming a hard mask layer over the patterned sacrificial layer, and over the write pole layer; forming a photoresist mask over a portion of the hard mask layer above the write pole layer; forming a trailing surface bevel on the write pole layer by carrying out a milling operation at an angle relative to a normal to an upper surface of the photoresist mask.

2. The method of claim 1 and wherein the patterned sacrificial layer comprises amorphous carbon.

3. The method of claim 1 and wherein the hard mask layer comprises alumina.

4. The method of claim 1 and wherein a mill resistance of the sacrificial layer is greater than a mill resistance of a material of the side shield layers.

5. A method comprising:
   forming a write pole layer having a front surface, a leading surface, a trailing surface and side surfaces connecting the leading surface to the trailing surface, the front surface forming a portion of a bearing surface of a recording head that includes the write pole layer;
   forming side shield layers proximate to the side surfaces of the write pole layer;
   planarizing the side shield layers such that trailing surfaces of the side shield layers are substantially flush with the trailing surface of the write pole layer;
   depositing a sacrificial layer on the planarized side shield layers and not on the write pole layer;
   forming a hard mask layer over the sacrificial layer, and over the write pole layer; forming a photoresist mask over a portion of the hard mask layer above the write pole layer; forming a trailing surface bevel on the write pole layer by carrying out a milling operation at an angle relative to a normal to an upper surface of the photoresist mask.

6. The method of claim 5 and wherein the sacrificial layer comprises amorphous carbon.

7. The method of claim 5 and wherein the hard mask layer comprises alumina.

8. The method of claim 5 and wherein the photoresist mask is recessed behind the bearing surface.

9. The method of claim 8 and wherein a mill resistance of the sacrificial layer is greater than a mill resistance of a material of the side shield layers.

* * * * *